(No Model.)

E. B. WHITNEY.
COMBINED CARRIAGE AND SLED.

No. 412,866. Patented Oct. 15, 1889.

Attest:
Walter Donaldson
J. E. Middleton

Inventor
E. B. Whitney
by Ellis Spear
Atty.

UNITED STATES PATENT OFFICE.

EDMUND BARTON WHITNEY, OF GLOVERSVILLE, NEW YORK.

COMBINED CARRIAGE AND SLED.

SPECIFICATION forming part of Letters Patent No. 412,866, dated October 15, 1889.

Application filed August 24, 1889. Serial No. 321,872. (No model.)

*To all whom it may concern:*

Be it known that I, EDMUND BARTON WHITNEY, of Gloversville, in the county of Fulton and State of New York, have invented a new and useful Improvement in Combined Child's Carriage and Sled; and I do hereby declare that the following is a full, clear, and exact description of the same.

My invention is a combined child's carriage or wagon and sled, it being adapted to be used as a wagon by reversing the sled, so as to utilize the runners as the sides of the wagon-body, the axles for the wheels being removably connected to the face of the sled-top, which constitutes the bottom of the wagon.

My invention is designed to provide a simple and strong construction which may be utilized by children as a wagon in summer-time and as a sled in winter, the changes necessary to transform the sled into a wagon or the wagon into a sled being of such a simple nature as to be within the comprehension and capability of a very young child.

I have illustrated my invention by the accompanying drawings, in which—

Figure 1:
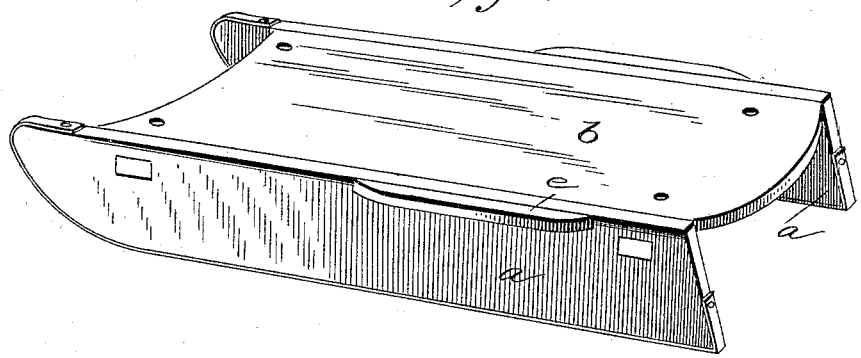
Figure 2:
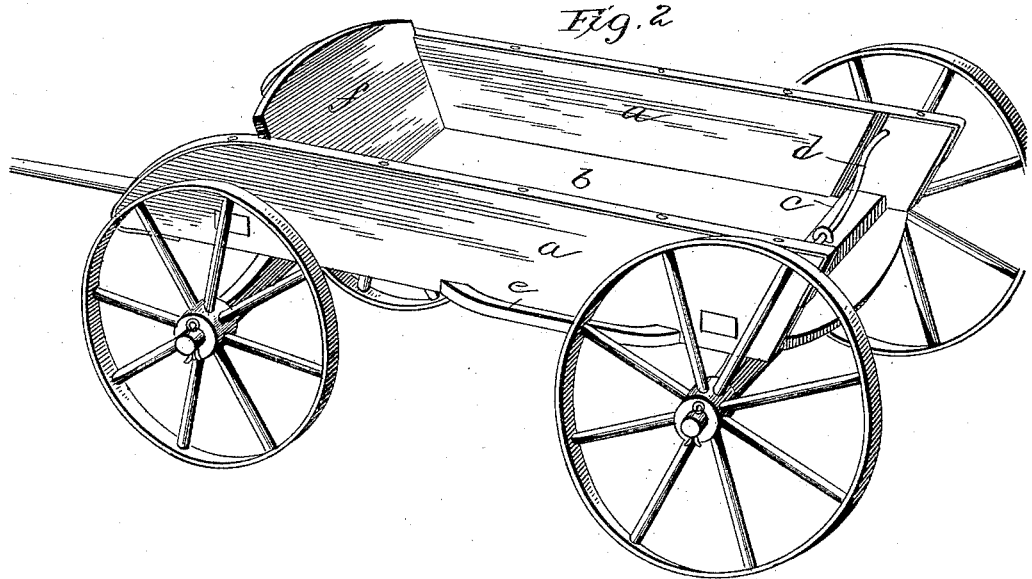
Figure 3:
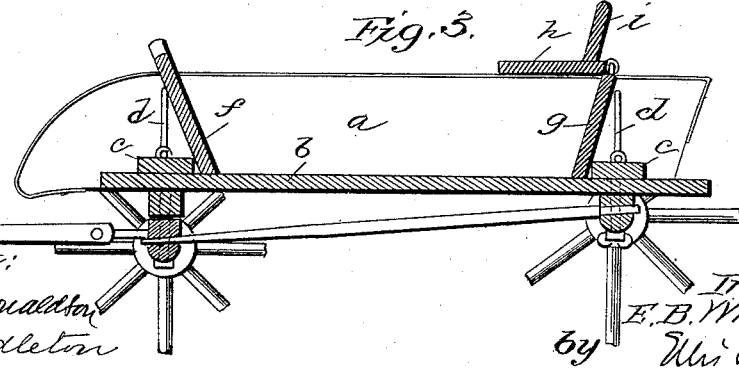

Figure 1 represents the invention in the form of a sled, while Fig. 2 shows it in the form of a wagon. Fig. 3 is a detail sectional view showing the front piece of the wagon and the back piece and seat therefor.

As I have shown in Fig. 1, the sled is of ordinary construction, consisting of the runners $a\ a$, which are suitably shod with metal, and a top $b$, which is supported by braces $c\ c$, extending across beneath the top and mortised in the runners. The runners are further strengthened by iron braces $d\ d$. Ledges $e\ e$ are provided on the edges of the top piece, so as to serve as hand-grips in the use of the sled.

The running-gear which is used to transform the sled into a wagon consists, simply, of a rear and front axle connected by a central reach-rod suitably braced with a bracket connected to the front axle, adapted to be secured by thumb-screws and nuts to the top board of the sled when it is arranged in an inverted position upon the running-gear, and the rear axle is removably supported in like manner. This makes a very simple form of running-gear, and as the parts of it are all connected together there is no danger of displacement or loss when the invention is used as a sled.

To provide a front for the wagon I simply groove the inner faces of the runners, preferably at an angle, and insert a plain piece $f$, fitted to said grooves. I groove the rear ends of the runners in the same way and insert a piece $g$ therein to form a back, and to this back I hinge a seat-board $h$, provided with a back $i$. If the wagon is of sufficient length, more seats may be provided, supported in the same way as the one shown. It will thus be seen that a very simple and compact wagon is provided, and in order to change it to a sled it is only necessary to remove the front and end pieces, which slip out easily, and take off the running-gear by unscrewing the thumb-nuts, and then the sled is free to be used.

While I have shown and described the invention as applied to children's wagons, I do not limit myself in this connection, as the invention may be applied to vehicles of full size and having either two or four wheels, or to toy wagons and carts designed for indoor use by small children.

What I claim is—

1. A combined wagon and sled consisting of a sled-body and a running-gear connected thereto, the said sled-body being inverted to form the body of the wagon, substantially as described.

2. In combination, a sled-body, a running-gear connected thereto, and removable front and end pieces, substantially as described.

3. In combination, a sled-body, a running-gear removably connected thereto, removable front and end pieces, and a pivoted seat connected to one of the pieces, substantially as described.

In testimony whereof I have signed my name to this specification in the presence of two subscribing witnesses.

EDMUND BARTON WHITNEY.

Witnesses:
W. J. HEACOCK,
HENRY H. PETTIT.